(12) United States Patent
Shan

(10) Patent No.: US 11,262,621 B2
(45) Date of Patent: Mar. 1, 2022

(54) OPTICAL FILM LAYER AND DISPLAY DEVICE

(71) Applicant: HKC Corporation Limited, Guangdong (CN)

(72) Inventor: Jianfeng Shan, Shenzhen (CN)

(73) Assignee: HKC Corporation Limited, Shenzhen (CN)

( * ) Notice: Subject to any disclaimer, the term of this patent is extended or adjusted under 35 U.S.C. 154(b) by 44 days.

(21) Appl. No.: 17/041,394

(22) PCT Filed: Feb. 19, 2019

(86) PCT No.: PCT/CN2019/075416
§ 371 (c)(1),
(2) Date: Sep. 24, 2020

(87) PCT Pub. No.: WO2020/155206
PCT Pub. Date: Aug. 6, 2020

(65) Prior Publication Data
US 2021/0364838 A1     Nov. 25, 2021

(30) Foreign Application Priority Data
Jan. 30, 2019    (CN) .................. 201910090541.0

(51) Int. Cl.
*G02F 1/13363* (2006.01)
*G02B 5/04* (2006.01)
(Continued)

(52) U.S. Cl.
CPC ......... *G02F 1/13363* (2013.01); *G02B 5/045* (2013.01); *G02B 5/1814* (2013.01);
(Continued)

(58) Field of Classification Search
CPC ........... G02F 1/13363; G02F 1/133509; G02F 2201/30; G02F 2413/02; G02F 2413/05; G02B 5/045; G02B 5/1814; G02B 5/3016
See application file for complete search history.

(56) References Cited

U.S. PATENT DOCUMENTS

2002/0163723 A1* 11/2002 Suzudo ............... G02B 27/283
                                                                         359/489.11
2007/0296896 A1* 12/2007 Hong .................. H04N 13/305
                                                                         349/122
(Continued)

FOREIGN PATENT DOCUMENTS

| CN | 103487987 A | 1/2014 |
|----|-------------|--------|
| CN | 108227061 A | 6/2018 |

(Continued)

OTHER PUBLICATIONS

International Search Report for Application No. PCT/CN2019/075416, dated Oct. 15, 2019, 4 pages.
(Continued)

*Primary Examiner* — Nathanael R Briggs
(74) *Attorney, Agent, or Firm* — Rosenberg, Klein & Lee

(57) ABSTRACT

The present application relates to an optical film layer and a display device. The optical film layer comprises: an isotropic optical layer, a plurality of grooves being formed on one side of the isotropic optical layer; a single optical axis anisotropic optical layer, comprising a plate-shaped part and a plurality of convex structures which match the shape and size of the grooves and which are attached to one side of the plate-shaped part, the ordinary light refractive index of the single optical axis anisotropic optical layer is greater than that of the isotropic optical layer; a first grating layer, stacked on the side of the single optical axis anisotropic optical layer away from the isotropic optical layer or embedded in the side of
(Continued)

the single optical axis anisotropic optical layer away from the isotropic optical layer.

17 Claims, 7 Drawing Sheets

(51) Int. Cl.
    *G02B 5/18*     (2006.01)
    *G02B 5/30*     (2006.01)
    *G02F 1/1335*     (2006.01)

(52) U.S. Cl.
    CPC ..... *G02B 5/3016* (2013.01); *G02F 1/133509* (2013.01); *G02F 2201/30* (2013.01); *G02F 2413/02* (2013.01); *G02F 2413/05* (2013.01)

(56) References Cited

U.S. PATENT DOCUMENTS

2012/0069272 A1*   3/2012   Sugita ................. G02B 5/0257
                                                                           349/64
2014/0353618 A1   12/2014   Shim et al.

FOREIGN PATENT DOCUMENTS

| | | |
|---|---|---|
| CN | 109085718 A | 12/2018 |
| CN | 109116623 A | 1/2019 |
| CN | 109143673 A | 1/2019 |
| CN | 109143677 A | 1/2019 |
| CN | 109212820 A | 1/2019 |
| CN | 109212823 A | 1/2019 |
| JP | 2003262712 A | 9/2003 |

OTHER PUBLICATIONS

Chinese Office Action for Application No. 201910090541.0, dated Sep. 27, 2019, 8 pages.
Chinese Office Action for Application No. 201910090541.0, dated May 28, 2020, 7 pages.

* cited by examiner

OPTICAL FILM LAYER AND DISPLAY DEVICE

CROSS REFERENCE TO RELATED APPLICATIONS

This application is a U.S. National Stage application of, and claims priority to, PCT/CN2019/075416, filed Feb. 19, 2019, which further claims priority to Chinese Patent Application No. 201910090541.0, filed Jan. 30, 2019, the entire contents of which are incorporated herein in their entirety.

TECHNICAL FIELD

This application relates to an optical film layer and a display device.

BACKGROUND

The description herein provides only background information related to this application, but does not necessarily constitute the existing technology.

Current large-sized liquid crystal display panels are usually Vertical Alignment (VA) liquid crystal panels or In-Plane Switching (IPS) liquid crystal panels. Compared with an IPS liquid crystal panel, a VA liquid crystal panel has advantages such as relatively high production efficiency and low manufacturing costs, but has obvious optical property disadvantages in terms of optical property. Particularly, a large-sized panel needs a relatively large-viewing angle presentation in terms of commercial application. For example, when large-viewing angle brightness is rapidly saturated with a voltage, driving of a VA liquid crystal panel causes severe degradation in terms of picture quality contrast and color shift of a large viewing angle as compared with picture quality of a front viewing angle, and a viewing angle color shift is generated.

Therefore, in an exemplary VA liquid crystal panel, severe degradation in terms of picture quality contrast and color shift of a large viewing angle, as compared with picture quality of a front viewing angle, exists, and a viewing angle color shift is generated.

SUMMARY

According to various embodiments disclosed by this application, an optical film layer and a display device are provided.

An optical film layer is provided, comprising:

an isotropic optical layer, wherein a plurality of grooves are formed on a side of the isotropic optical layer;

an optically-uniaxial anisotropic optical layer, comprising a plate-shaped portion and a plurality of protruding structures that match shapes and sizes of the grooves and that are in contact with a side of the plate-shaped portion, wherein an ordinary light refractive index of the optically-uniaxial anisotropic optical layer is greater than a refractive index of the isotropic optical layer; and a first grating layer, stacked on a side of the optically-uniaxial anisotropic optical layer away from the isotropic optical layer, or embedded in a side of the optically-uniaxial anisotropic optical layer away from the isotropic optical layer.

In an embodiment, the ordinary light refractive index of the optically-uniaxial anisotropic optical layer ranges from 1.0 to 2.5.

In an embodiment, the refractive index of the isotropic optical layer ranges from 1.0 to 2.5.

In an embodiment, a difference between the ordinary light refractive index of the optically-uniaxial anisotropic optical layer and the refractive index of the isotropic optical layer ranges from 0.01 to 2

In an embodiment, the protruding structure is a triangular prism structure, a side surface of the triangular prism structure extends in a manner of contacting with the plate-shaped portion, extension directions of the plurality of protruding structures are parallel, and two adjacent protruding structures are disposed at intervals.

In an embodiment, the protruding structure is a triangular pyramid structure, the plurality of protruding structures are arranged as a two-dimensional matrix array, and two adjacent protruding structures are disposed at intervals.

In an embodiment, a material of the optically-uniaxial anisotropic optical layer comprises a dish-shaped liquid crystal molecule material In an embodiment, the first grating layer is stacked on the side of the optically-uniaxial anisotropic optical layer away from the isotropic optical layer, the first grating layer comprises a transparent substrate and a plurality of strip-shaped metal layers formed on the transparent substrate, and the plurality of metal layers are disposed at intervals and in parallel; or the first grating layer is embedded in the side of the optically-uniaxial anisotropic optical layer away from the isotropic optical layer, the first grating layer comprises a plurality of strip-shaped metal layers formed in a side of the optically-uniaxial anisotropic optical layer, and the plurality of metal layers are disposed at intervals and in parallel.

In an embodiment, a width of the metal layer ranges from 50 nm to 150 nm, a thickness of the metal layer ranges from 100 nm to 200 nm, and a spacing between two adjacent metal layers ranges from 100 nm to 200 nm.

An optical film layer is provided, comprising:

an isotropic optical layer, wherein a plurality of grooves are formed on a side of the isotropic optical layer;

an optically-uniaxial anisotropic optical layer, comprising a plate-shaped portion and a plurality of protruding structures that match shapes and sizes of the grooves and that are in contact with one side of the plate-shaped portion, wherein an ordinary light refractive index of the optically-uniaxial anisotropic optical layer is greater than a refractive index of the isotropic optical layer; and a first grating layer, stacked on a side of the optically-uniaxial anisotropic optical layer away from the isotropic optical layer, or embedded in a side of the optically-uniaxial anisotropic optical layer away from the isotropic optical layer, wherein:

the ordinary light refractive index of the optically-uniaxial anisotropic optical layer ranges from 1.0 to 2.5, and the refractive index of the isotropic optical layer ranges from 1.0 to 2.5; and a difference between the ordinary light refractive index of the optically-uniaxial anisotropic optical layer and the refractive index of the isotropic optical layer ranges from 0.01 to 2.

A display device is provided, comprising:

a backlight module, configured to provide incident light; and a display panel, disposed above the backlight module, and configured to receive the incident light and display a picture, wherein the display panel comprises:
the optical film layer as stated above;
a first substrate, disposed on a side of the optical film layer away from the isotropic optical layer;
a second substrate, disposed opposite to the first substrate;
a display layer, disposed between the first substrate and the second substrate;
a second grating layer, disposed between the display layer and the second substrate; and
a photoresist layer, disposed between the second grating layer and the second substrate, or a photoresist layer, disposed between the first substrate and the display layer.

In an embodiment, the photoresist layer is disposed between the second grating layer and the second substrate, and the display panel further comprises:
a compensation film layer, disposed between the display layer and the second grating layer; and
a compensation film layer, disposed between the display layer and the first substrate.

In an embodiment, the photoresist layer is disposed between the second grating layer and the second substrate, and the display panel further comprises:
a compensation film layer, disposed between the display layer and the second grating layer.

In an embodiment, the photoresist layer is disposed between the second grating layer and the second substrate, and the display panel further comprises:
a compensation film layer, disposed between the display layer and the first substrate.

In an embodiment, the photoresist layer is disposed between the first substrate and the display layer, and the display panel further comprises:
a compensation film layer, disposed between the display layer and the second grating layer; and
a compensation film layer, disposed between the photoresist layer and the first substrate.

In an embodiment, the photoresist layer is disposed between the first substrate and the display layer, and the display panel further comprises:
a compensation film layer, disposed between the display layer and the second grating layer.

In an embodiment, the photoresist layer is disposed between the first substrate and the display layer, and the display panel further comprises:
a compensation film layer, disposed between the photoresist layer and the first substrate.

Details of one or more embodiments of this application are provided in the following accompanying drawings and descriptions. Other features and advantages of this application become apparent from the specification, the accompanying drawings, and the claims.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person skilled in the art may still derive other drawings from these accompanying drawings without creative efforts.

DETAILED DESCRIPTION OF THE EMBODIMENTS

To make the technical solutions and advantages of this application clearer and more comprehensible, the following further describes this application in detail with reference to the accompanying drawings and embodiments. It should be understood that the specific embodiments described herein are merely used to explain this application but are not intended to limit this application.

Figure 1:
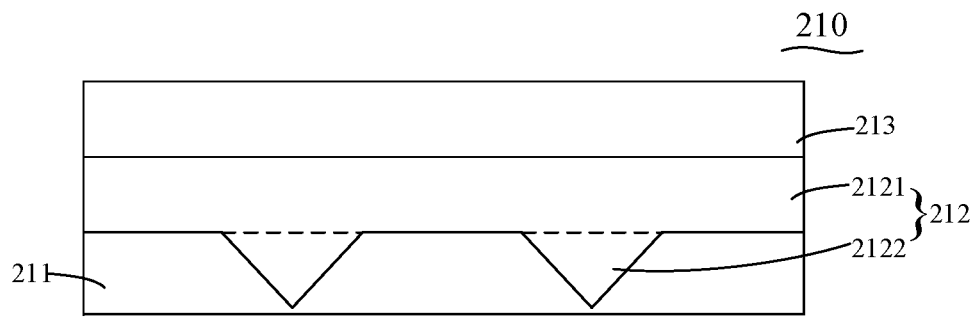
FIG. 1 is a schematic structural diagram of an optical film layer according to an embodiment.
Figure 2:
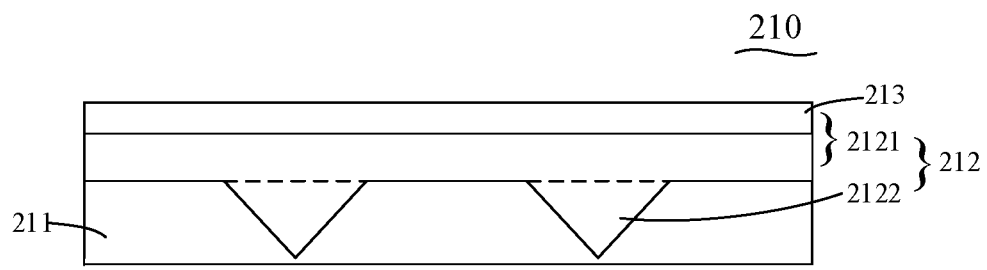
FIG. 2 is a schematic structural diagram of an optical film layer according to an embodiment.

Referring to FIG. 1 and FIG. 2, FIG. 1 and FIG. 2 are schematic structural diagrams of an optical film layer according to this embodiment.

In this embodiment, an optical film layer 210 includes an isotropic optical layer 211, an optically-uniaxial anisotropic optical layer 212, and a first grating layer 213. The first grating layer 213 is stacked on a side of the optically-uniaxial anisotropic optical layer 212 away from the isotropic optical layer 211 (refer to FIG. 1), or is embedded in a side of the optically-uniaxial anisotropic optical layer 212 away from the isotropic optical layer 211 (refer to FIG. 2).

A plurality of grooves are formed on a side of the isotropic optical layer 211. The isotropic optical layer 211 has optical isotropy, and has the same refractive index in all directions. In an embodiment, a refractive index $ns_1$ of the isotropic optical layer 211 ranges from 1.0 to 2.5. In an embodiment, a material of the isotropic optical layer 211 is a material having an isotropic refractive index, and may be an organic transparent material or an inorganic transparent material coated on a photoresist as a planarization structure.

The optically-uniaxial anisotropic optical layer 212 has optical anisotropy and has an extraordinary light refractive index $ne_2$ and an ordinary light refractive index $no_2$. In an embodiment, the optically-uniaxial anisotropic optical layer 212 is a negative optically-uniaxial optical layer, that is, $ne_2 < no_2$. The extraordinary light refractive index $ne_2$ is an equivalent refractive index of the optically-uniaxial anisotropic optical layer 212 when a polarization direction of a light is parallel to an optical axis. The ordinary light refractive index $no_2$ is an equivalent refractive index of the optically-uniaxial anisotropic optical layer 212 when a polarization direction of a light is perpendicular to an optical axis. When light passes through the optically-uniaxial anisotropic optical layer 212, a birefringence phenomenon is generated. Specifically, an xyz coordinate system is established, in which nx is a refractive index of the optically-uniaxial anisotropic optical layer 212 in an x direction, ny is a refractive index of the optically-uniaxial anisotropic optical layer 212 in a y direction, nz is a refractive index of the optically-uniaxial anisotropic optical layer 212 in a z direction, and the z direction is an extension direction of a film thickness of the optically-uniaxial anisotropic optical layer 212 (perpendicular to a light emitting surface of the optically-uniaxial anisotropic optical layer 212), and $nx=ny(no_2) > nz(ne_2)$. In an embodiment, the ordinary light refractive index $no_2$ of the optically-uniaxial anisotropic optical layer 212 ranges from 1.0 to 2.5. In an embodiment, a material of the optically-uniaxial anisotropic optical layer 212 includes, but is not limited to, a dish-shaped liquid crystal molecule material.

Specifically, the ordinary light refractive index $no_2$ of the optically-uniaxial anisotropic optical layer 212 is greater than the refractive index $ns_1$ of the isotropic optical layer 211. Specifically, a difference between the ordinary light refractive index $no_2$ of the optically-uniaxial anisotropic optical layer 212 and the refractive index $ns_1$ of the isotropic optical layer 211 ranges from 0.01 to 2. When the difference between $no_2$ and $ns_1$ is greater, it is easier to allocate front-viewing light energy to a large viewing angle. In an embodiment, the ordinary light refractive index $no_2$ of the optically-uniaxial anisotropic optical layer 212 is parallel to a 0/180 degree direction, and the extraordinary light refractive index $ne_2$ of the optically-uniaxial anisotropic optical layer 212 is parallel to a 90/270 degree direction. In an embodiment, the ordinary light refractive index $no_2$ of the optically-uniaxial anisotropic optical layer 212 is parallel to a 90/270 degree direction, and the extraordinary light refractive index $ne_2$ of the optically-uniaxial anisotropic optical layer 212 is parallel to a 0/180 degree direction. A plane constituted by the 0/180 degree direction and the 90/270 degree direction is parallel to the light emitting surface of the optically-uniaxial anisotropic optical layer 212.

Figure 3:
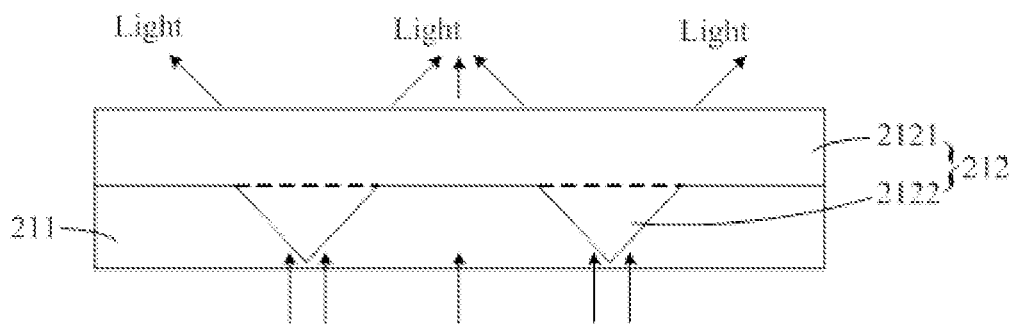
FIG. 3 is a schematic diagram of an interface not perpendicular to a forward traveling direction of light producing a refraction effect.

In an embodiment of the present disclosure, a plurality of grooves are formed on a side of the isotropic optical layer 211, and the optically-uniaxial anisotropic optical layer 212 includes a plate-shaped portion 2121 and a plurality of protruding structures 2122 that match shapes and sizes of the grooves and that are in contact with a side of the plate-shaped portion 2121. Because the ordinary light refractive index $no_2$ of the optically-uniaxial anisotropic optical layer 212 is greater than the refractive index $ns_1$ of the isotropic optical layer 211, a light incident surface of protruding structure 2122 forms an interface not perpendicular to a forward traveling direction of light, The interface not perpendicular to the forward traveling direction of light produces a refraction effect (refer to FIG. 3), to generate an angular change in traveling of light. Specifically, the protruding structures are cyclically arranged. To be specific, refraction portions constituted by the protruding structures are cyclically arranged.

Figure 4:
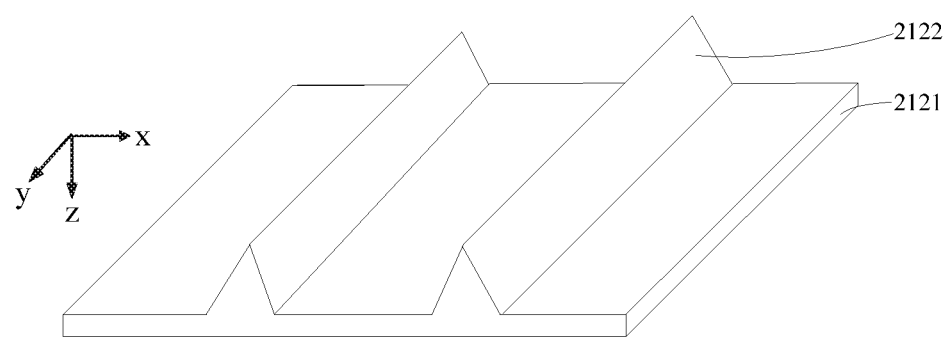
FIG. 4 is a three-dimensional schematic structural diagram of an optically-uniaxial anisotropic optical layer according to an embodiment.
Figure 5:
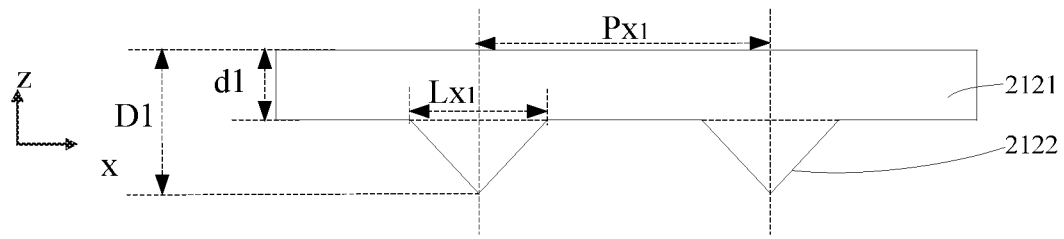
FIG. 5 is a schematic diagram of a cross-section structure corresponding to the optically-uniaxial anisotropic optical layer of FIG. 4.

In an embodiment, referring to FIG. 4, the protruding structure 2122 is a triangular prism structure, the triangular prism structure has a plurality of side surfaces, and a side surface of the triangular prism structure extends in a manner of contacting with the plate-shaped portion 2121, extension directions of the plurality of protruding structures 2122 are parallel, and two adjacent protruding structures 2122 are disposed at intervals. Specifically, also referring to FIG. 5, a width of a side surface of the protruding structure 2122 that is in contact with the plate-shaped portion 2121 is $Lx_1$, and a distance between centers of side surfaces of two adjacent protruding structures 2122 that are in contact with the plate-shaped portion 2121 is $Px_1$, where $Px_1 \geq Lx_1$. When $Px_1 = Lx_1$, the two adjacent protruding structures are disposed in contact with each other. A thickness of the protruding structure 2122 is $d_1$, and a thickness of the optically-uniaxial anisotropic optical layer 212 is $D_1$, where $d_1$ is not 0, and $D_1 \geq d_1$.

Figure 6:
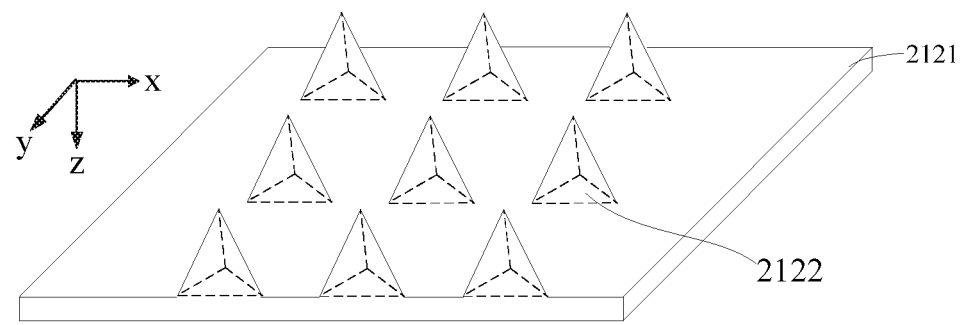
FIG. 6 is a three-dimensional schematic structural diagram of an optically-uniaxial anisotropic optical layer according to another embodiment.
Figure 6:
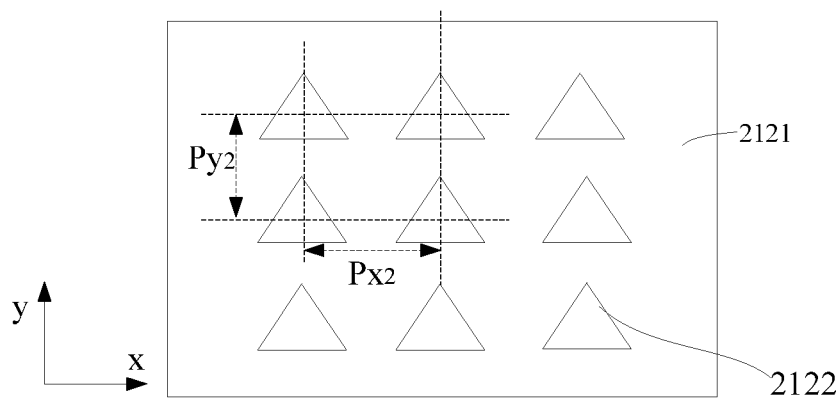
Figure 7:
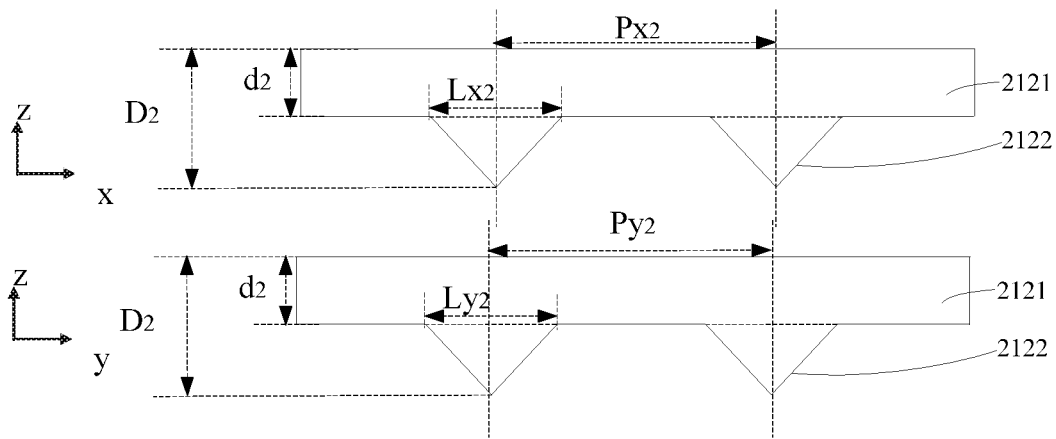
FIG. 7 is a schematic diagram of a cross-section structure corresponding to the optically-uniaxial anisotropic optical layer of FIG. 6.

In an embodiment, referring to FIG. 6, the protruding structure 2122 is a triangular pyramid structure, the plurality of protruding structures 2122 are arranged as a two-dimensional matrix array, and two adjacent protruding structures 2122 are disposed at intervals, to allocate front-viewing angle light energy to dimensional directions more effectively, so that full-viewing angle viewing is more uniform. Specifically, also referring to FIG. 7, in the x direction, a width of a side surface of the protruding structure 2122 that is in contact with the plate-shaped portion 2121 is $Lx_2$, and a distance between centers of side surfaces of two adjacent protruding structures 2122 that are in contact with the plate-shaped portion 2121 is $Px_2$, where $Px_2 \geq Lx_2$. When $Px_2 = Lx_2$, the two adjacent protruding structures are disposed in contact with each other in the x direction. In the y direction, a width of a side surface of the protruding structure 2122 that is in contact with the plate-shaped portion 2121 is $Ly_2$, and a distance between centers of side surfaces of two adjacent protruding structures 2122 that are in contact with the plate-shaped portion 2121 is $Py_2$, where $Py_2 \geq Ly$. When $Py_2 = Ly_2$, the two adjacent protruding structures are disposed in in contact with each other in the y direction. A thickness of the protruding structure 2122 is $d_2$, and a thickness of the optically-uniaxial anisotropic optical layer 212 is $D_2$, where $d_2$ is not 0, and $D_2 \geq d_2$.

In an embodiment of the present disclosure, the first grating layer 213 is stacked on a side of the optically-uniaxial anisotropic optical layer 212 away from the isotropic optical layer 211, or embedded in a side of the optically-uniaxial anisotropic optical layer 212 away from the isotropic optical layer 211. The first grating layer 213 can convert natural light into polarized light. A thickness of the first grating layer 213 is usually less than 20 μm.

Figure 8:
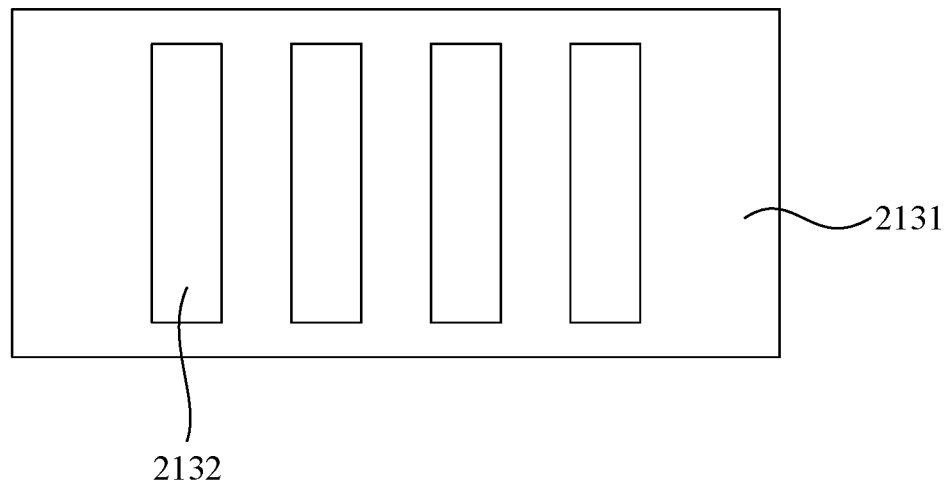
FIG. 8 is a schematic structural diagram of a first grating layer of the optical film layer shown in FIG. 2.

Specifically, when the first grating layer 213 is stacked on the side of the optically-uniaxial anisotropic optical layer 212 away from the isotropic optical layer 211, referring to FIG. 8, the first grating layer includes a transparent substrate 2131 and a plurality of strip-shaped metal layers 2132 formed on the transparent substrate 2131, and the plurality of metal layers 2132 are disposed at intervals and in parallel. The transparent substrate 2131 includes, but is not limited to, one of a glass substrate, a silicone substrate, a silicon oxide substrate, a silicon nitride substrate, a polymethylmethacrylate substrate, and a polyethylene terephthalate substrate. The metal layer 2132 includes, but is not limited to gold, aluminum, and copper. The metal layers 2132 are formed on the transparent substrate 2131, the plurality of metal layers 2132 are uniformly arranged along a straight line at intervals, and extension directions of the plurality of metal layers 2132 are parallel to each other, to from a grating. Further, a width of the metal layer 2132 ranges from 50 nm to 150 nm, a thickness of the metal layer 2132 ranges from 100 nm to 200 nm, and a spacing between two adjacent metal layers 2132 ranges from 100 nm to 200 nm.

Specifically, when the first grating layer 213 is embedded in the side of the optically-uniaxial anisotropic optical layer 212 away from the isotropic optical layer 211, the first grating layer includes a plurality of strip-shaped metal layers formed in the side of the optically-uniaxial anisotropic optical layer 212, and the plurality of metal layers are disposed at intervals and in parallel. The metal layer includes, but is not limited to gold, aluminum, and copper. The metal layers are formed in the side of the optically-uniaxial anisotropic optical layer 212, the plurality of metal layers are uniformly arranged along a straight line at intervals, and extension directions of the plurality of metal layers are parallel to each other, to from a grating. Further, a width of the metal layer ranges from 50 nm to 150 nm, a thickness of the metal layer 2132 ranges from 100 nm to 200 nm, and a spacing between two adjacent metal layers 2132 ranges from 100 nm to 200 nm.

In an embodiment of the present disclosure, on the first grating layer 213, electromagnetic wave are classified as an electromagnetic wave whose vibration direction is perpendicular to the extension direction of the metal layer and an electromagnetic wave whose vibration direction is parallel to the extension direction of the metal layer. The first grating layer 213 absorbs or reflects an electromagnetic wave component whose electromagnetic wave vibration component is parallel to the extension direction of the metal layer, and only an electromagnetic wave component whose electromagnetic wave vibration component is perpendicular to the extension direction of the metal layer transmits through the first grating layer 213, so that a function the same as that of a polarizing plate is obtained, and only polarized light perpendicular to extensiona stretching direction of the polarizing plate transmits through.

Specifically, light consists of horizontal polarization (an electric field vibration direction is a 0/180 degree direction) and vertical polarization (an electric field vibration direction is a 90/270 degree direction), and the first grating layer 213 has a function of absorbing polarized light and a function of allowing polarized light to transmit through.

When an arrangement direction of the metal layer of the first grating layer 213 is parallel to the 0/180 degree direction, an extension direction of the metal layer of the first grating layer 213 is parallel to the 90/270 degree direction. Assuming that horizontal polarized light can pass through the first grating layer 213, a refractive index when the horizontal polarized light passes through the isotropic optical layer 211 is $ns_1$, and an equivalent refractive index when the horizontal polarized light passes through the optically-uniaxial anisotropic optical layer 212 is $no_2$, because $ns_1 < no_2$, an optical phenomenon that the horizontal polarized light is emitted from an optically thinner medium to an optically denser medium and produces a refraction effect, to allocate front-viewing angle light energy to a large viewing angle, can be seen on an interface between the isotropic optical layer 211 and the optically-uniaxial anisotropic optical layer 212.

When an arrangement direction of the metal layer of the first grating layer 213 is parallel to the 90/270 degree direction, an extension direction of the metal layer of the first grating layer 213 is parallel to the 0/180 degree direction. Assuming that vertical polarized light can pass through the first grating layer 213, a refractive index when the vertical polarized light passes through the isotropic optical layer 211 is $no_1$, and a refractive index when the vertical polarized light passes through the optically-uniaxial anisotropic optical layer 212 is $ns_2$, because $ns_2 > no_1$, an optical phenomenon that the vertical polarized light is emitted from an optically thinner medium to an optically denser medium and produces a refraction effect, to allocate front-viewing angle light energy to a large viewing angle, can be seen on an interface between the optically-uniaxial anisotropic optical layer 212 and the isotropic optical layer 211.

The optical film layer provided by this embodiment includes the isotropic optical layer 211, the optically-uniaxial anisotropic optical layer 212, and the first grating layer 213. The ordinary light refractive index of optically-uniaxial anisotropic optical layer 211 is greater than the refractive index of isotropic optical layer 212, so that a refraction effect is produced when light passes through an interface of the protruding structure, to allocate front-viewing angle light energy to a large viewing angle, thereby alleviating a viewing angle color shift. The first grating layer 213 is stacked on a side of the optically-uniaxial anisotropic optical layer 212 away from the isotropic optical layer 211, or embedded in a side of the optically-uniaxial anisotropic optical layer 212 away from the isotropic optical layer 211, and can convert natural light into polarized light to replace a polarizing plate having a relatively large thickness. Hence, the foregoing optical film layer not only can alleviate a large-viewing angle color shift, but also can convert natural light into polarized light, to replace a polarizing plate.

Figure 9:
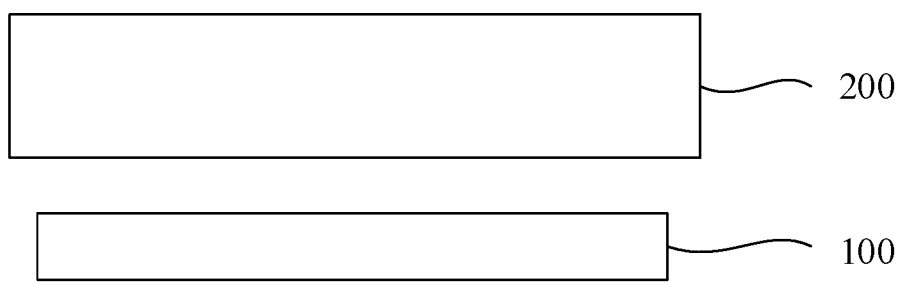
FIG. 9 is a schematic structural diagram of a display device according to an embodiment.

Referring to FIG. 9, FIG. 9 is a schematic structural diagram of a display device in this embodiment.

In this embodiment, a display device 10 includes a backlight module 100 and a display panel 200. The backlight module 100 provides collimated light emitting backlight (collimated light emitting BL) light source, to concentrate and output energy of light at a front viewing angle.

Figure 10:
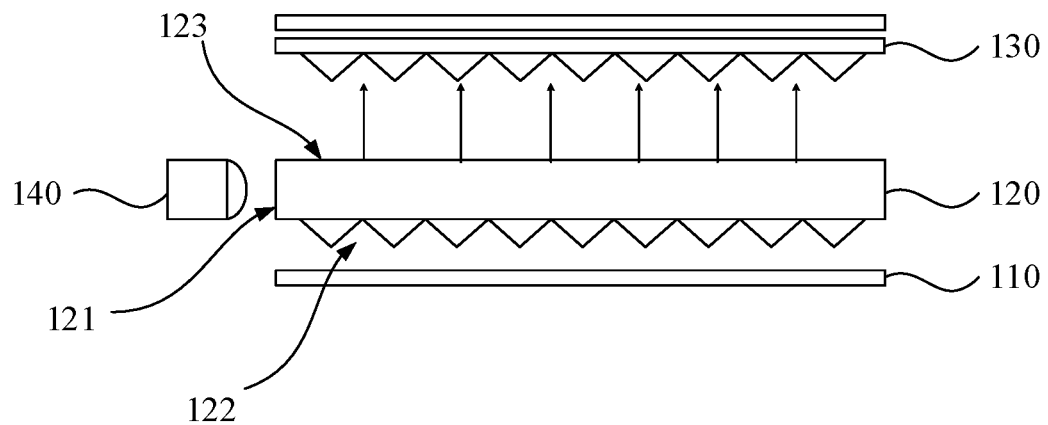
FIG. 10 is a schematic structural diagram of a backlight module of the display device shown in FIG. 9.

In an embodiment of the present disclosure, referring to FIG. 10, the backlight module 100 has backlight light output having high directivity, and includes a reflector plate 110, a light guide plate 120, a prism film 130, and an LED light source 140. The reflector plate 110, the light guide plate 120, and the prism film 130 are stacked sequentially. The light guide plate 120 has a light incident surface 121, and the LED light source 140 and the light incident surface 121 are disposed opposite to each other. A strip-shaped first groove 122 is opened on a side of the light guide plate 120 close to the reflector plate 110, a cross section of the first groove 122 is in a V shape, and an extension direction of the first groove 122 is perpendicular to a light emitting direction of the LED light source 140. A strip-shaped second groove 123 is opened on a side of the light guide plate 120 close to the prism film 130, a cross section of the second groove 123 is in a V shape, and an extension direction of the second groove 123 is parallel to the light emitting direction of the LED light source 140. Further, a prism side of the prism film 130 is stacked on the light guide plate 120.

Figure 11:
FIG. 11 is a schematic structural diagram of a display panel according to an embodiment in the display device shown in FIG. 9.
Figure 12:
FIG. 12 is a schematic structural diagram of a display panel according to an embodiment in the display device shown in FIG. 9.

In an embodiment of the present disclosure, referring to FIG. 11 and FIG. 12, FIG. 11 and FIG. 12 are schematic structural diagrams of a display panel in this embodiment.

In this embodiment, a display panel 200 includes an optical film layer 210, a first substrate 220, a display layer 230, a second grating layer 240, a photoresist layer 250, and a second substrate 260.

Specifically, the first substrate 220 is disposed on a side of the optical film layer 210 away from an isotropic optical layer 211; the second substrate 260 and the first substrate 220 are disposed opposite to each other; the display layer 230 is disposed between the first substrate 220 and the second substrate 260; the second grating layer 240 is disposed between the display layer 230 and the second substrate 260; and the photoresist layer 250 is disposed between the second grating layer 240 and the second substrate 26, or is disposed between the first substrate 220 and the display layer 230.

To be specific, in an embodiment, referring to FIG. 11, a display panel 200 includes an optical film layer 210, a first substrate 220, a display layer 230, a second grating layer 240, a photoresist layer 250, and a second substrate 260 that are disposed sequentially in a stacked manner. In another embodiment, referring to FIG. 12, a display panel 200 includes an optical film layer 210, a first substrate 220, a photoresist layer 250, a display layer 230, a second grating layer 240, and a second substrate 260 that are disposed sequentially in a stacked manner.

In an embodiment of the present disclosure, refer to relevant description in the previous embodiment for the optical film layer 210. Details are not described herein again. The optical film layer 210 not only can allocate front-viewing angle light energy to a large viewing angle to alleviate a viewing angle color shift, but also can convert natural light into polarized light, to replace a polarizing plate, thereby thinning a display panel.

In an embodiment of the present disclosure, the first substrate 220 is disposed on a side of an optical film layer 210 away from an isotropic optical layer 211. The second substrate 260 and the first substrate 220 are disposed opposite to each other. Materials of the first substrate 220 and the second substrate 260 are not limited, and specifically, a glass substrate may be selected. The display layer 230 includes a liquid crystal material layer and electrode layers disposed on upper and lower surfaces of the liquid crystal material layer. A material of the electrode layers is preferably, indium-tin oxide.

In an embodiment of the present disclosure, the second grating layer 240 includes a transparent substrate and a plurality of strip-shaped metal layers formed on the transparent substrate. The plurality of metal layers are disposed at intervals and in parallel. The transparent substrate includes, but is not limited to, one of a glass substrate, a silicone substrate, a silicon oxide substrate, a silicon nitride substrate, a polymethylmethacrylate substrate, and a polyethylene terephthalate substrate. The metal layer includes, but is not limited to gold, aluminum, and copper. The metal layers are formed on the transparent substrate, the plurality of metal layers are uniformly arranged along a straight line at intervals, and extension directions of the plurality of metal layers are parallel to each other, to from a grating. Further, a width of the metal layer ranges from 50 nm to 150 nm, a thickness of the metal layer ranges from 100 nm to 200 nm, and a spacing between two adjacent metal layers ranges from 100 nm to 200 nm. Further, the second grating layer 240 is disposed opposite to the first grating layer 213 of the optical film layer 210. To be specific, the plurality of metal layers of the second grating layer 240 corresponds to the plurality of metal layers of the first grating layer 213. The second grating layer 240 and the first grating layer 213 have similar structures and functions, and have a function of absorbing polarized light and a function of allowing polarized light to transmit through.

In an embodiment of the present disclosure, the photoresist layer 250 is configured to provide a hue for the display panel, to enable the display panel to form a color display picture. The photoresist layer 250 may be disposed between the second grating layer 240 and the second substrate 260, or may be disposed between the first substrate 220 and the display layer 230.

Figure 13:
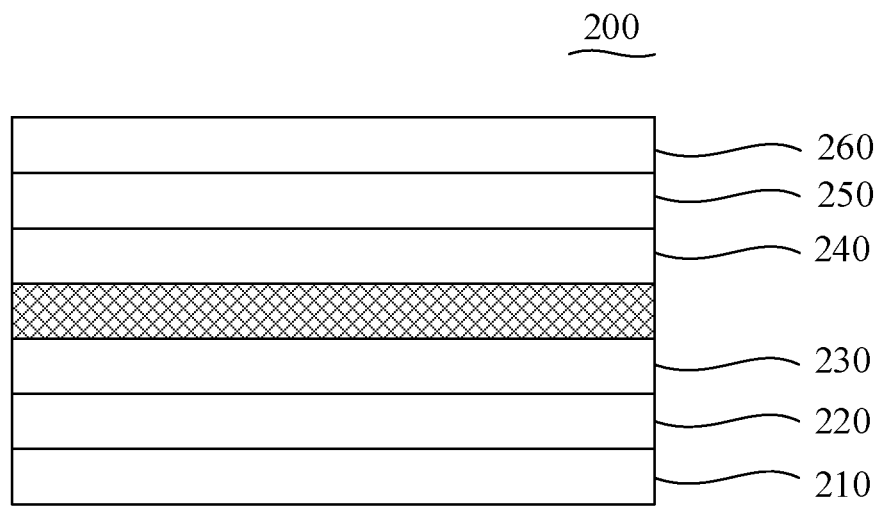
FIG. 13 is a schematic structural diagram of a display panel according to another embodiment corresponding to FIG. 11.
Figure 14:
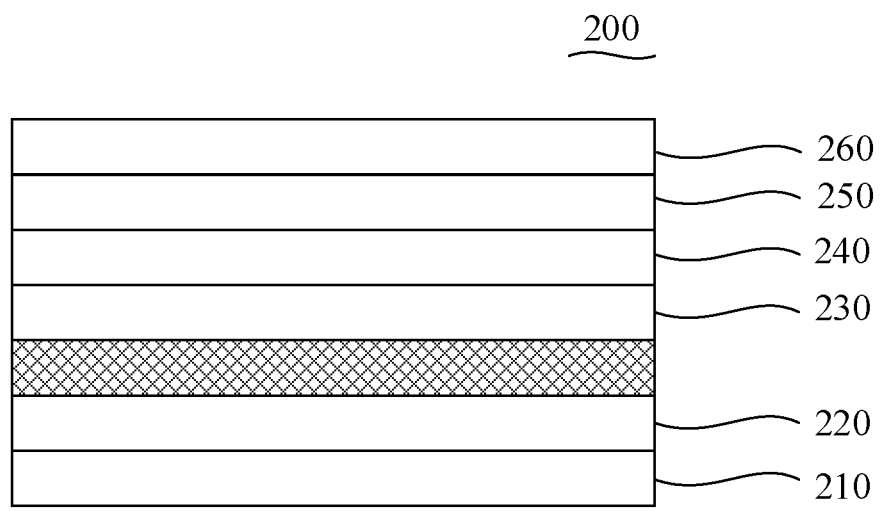
FIG. 14 is a schematic structural diagram of a display panel according to another embodiment corresponding to FIG. 11.
Figure 15:
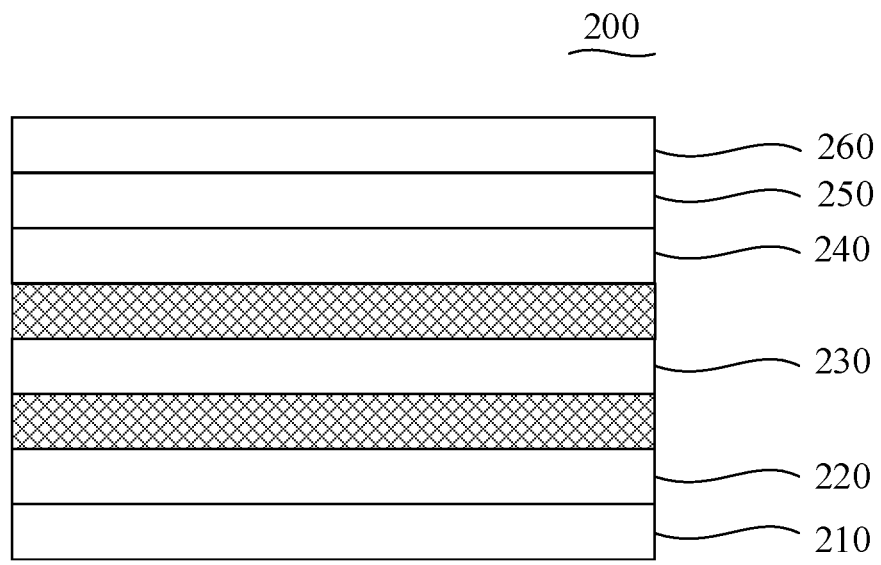
FIG. 15 is a schematic structural diagram of a display panel according to another embodiment corresponding to FIG. 11.

Referring to FIG. 13 to FIG. 15 together (a grid layer in the figures is a compensation film layer), in an embodiment, when the photoresist layer 250 is disposed between the second grating layer 240 and the second substrate 260, the display panel may further include: a compensation film layer between the display layer 230 and the second grating layer 240; and/or a compensation film layer disposed between the display layer 230 and the first substrate 220.

Figure 16:
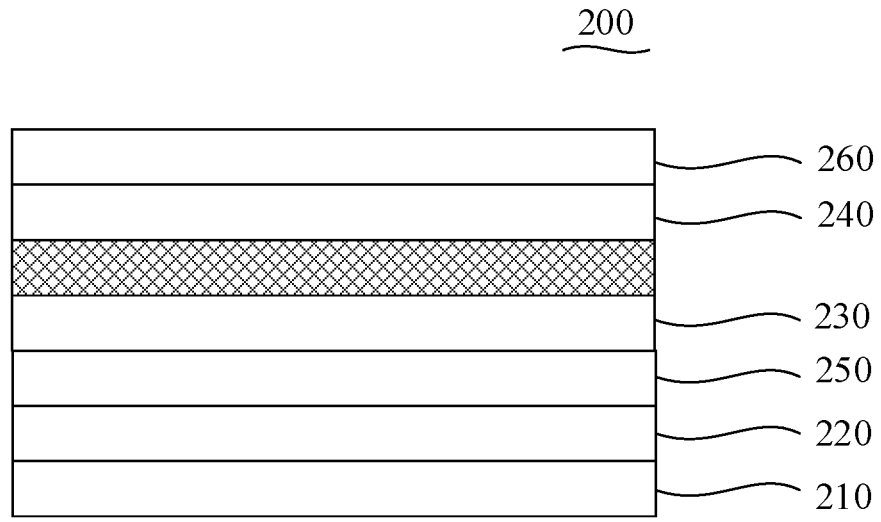
FIG. 16 is a schematic structural diagram of a display panel according to another embodiment corresponding to FIG. 12.
Figure 17:
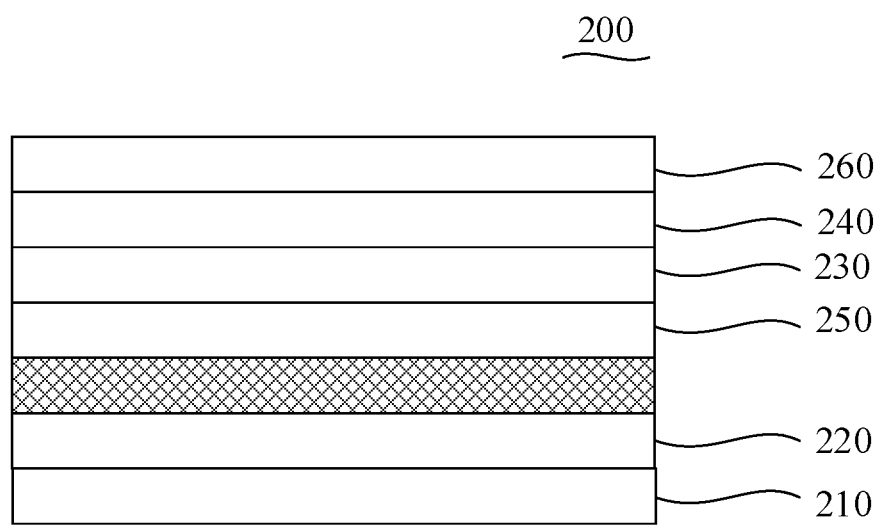
FIG. 17 is a schematic structural diagram of a display panel according to another embodiment corresponding to FIG. 12.
Figure 18:
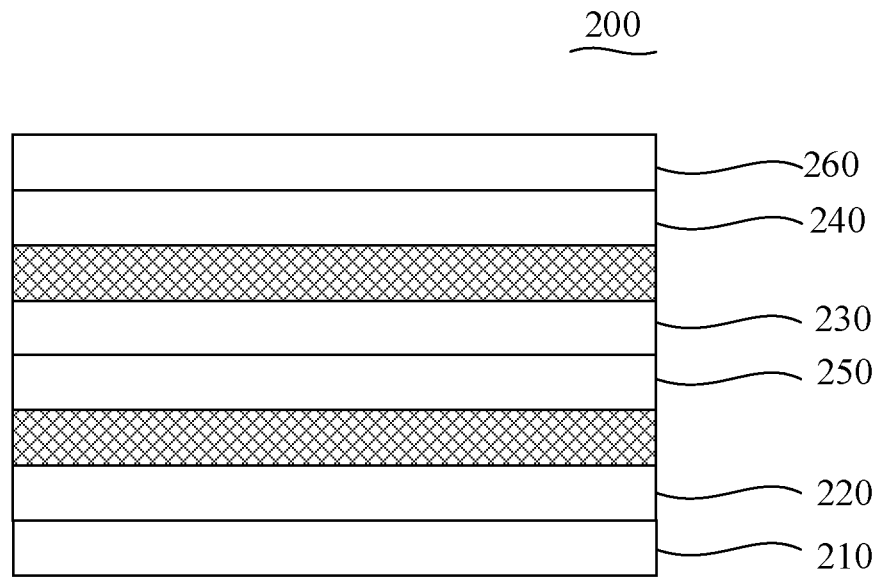
FIG. 18 is a schematic structural diagram of a display panel according to another embodiment corresponding to FIG. 12.

Referring to FIG. 16 to FIG. 18 together (a grid layer in the figures is a compensation film layer), in an embodiment, when the photoresist layer 250 is disposed between the first substrate 220 and the display layer 230, the display panel may further include: a compensation film layer disposed between the display layer 230 and the second grating layer 240; and/or a compensation film layer disposed between the photoresist layer 250 and the first substrate 220.

It should be noted that the display panel 200 is not limited to the foregoing stack structure, and materials having special functions may be added to different layers according to different requirements. For example, another function material may be added to a single-functional film layer, so as to obtain a multi-functional film layer. In addition, a sequence of stacking respective film layers in the display panel 200 can be changed according to a required function, In addition, another functional film layer and the like may alternatively be added according to requirements.

A display device 10 provided by this embodiment includes a backlight module 100 having backlight light output having high directivity and a display panel 200 that has a large viewing angle with a color shift alleviated and that is thinned. In the display panel 200, on the one hand, the optical film layer 210 is disposed, so as to allocate front-viewing angle light energy to a large viewing angle, to resolve a large-viewing angle color shift problem of the display panel 200 without dividing each sub-pixel into a primary pixel structure and a secondary pixel structure, thereby avoiding additionally designing metal wiring or a thin-film transistor element to drive a secondary pixel and sacrificing a light-transmissible opening area. The display panel 200 has high panel transmissivity and increased light emitting energy, and can produce a power-saving effect while maintaining display resolution and a driving frequency of the display panel 200. On the other hand, both of the first grating layer 213 and the second grating layer 240 can convert natural light into polarized light, to replace a polarizing plate having a relatively large thickness, thereby thinning the display panel 200. Therefore, the display device 10 has a small volume and is thin, has a low display color shift rate and high display efficiency, and can improve users' experience.

Technical features in the foregoing embodiments may be combined randomly. For the brevity of description, not all possible combinations of various technical features in the foregoing embodiments are described. However, as long as combinations of these technical features do not contradict each other, it should be considered that the combinations all fall within the scope of this specification.

The foregoing embodiments only show several embodiments of this application and are described in detail, but they should not be construed as a limit to the patent scope of this application. It should be noted that, a person skilled in the art may make various changes and improvements without departing from the ideas of this application, which shall all fall within the protection scope of this application. Therefore, the protection scope of the patent of this application shall be subject to the appended claims.

What is claimed is:

1. An optical film layer, comprising:
   an isotropic optical layer, wherein a plurality of grooves are formed on a side of the isotropic optical layer;
   an optically-uniaxial anisotropic optical layer, including a plate-shaped portion and a plurality of protruding structures that match shapes and sizes of the grooves and that are in contact with a side of the plate-shaped portion, wherein an ordinary light refractive index of the optically-uniaxial anisotropic optical layer is greater than a refractive index of the isotropic optical layer; and
   a first grating layer, stacked on a side of the optically-uniaxial anisotropic optical layer away from the isotropic optical layer, or embedded in a side of the optically-uniaxial anisotropic optical layer away from the isotropic optical layer.

2. The optical film layer according to claim 1, wherein the ordinary light refractive index of the optically-uniaxial anisotropic optical layer ranges from 1.0 to 2.5.

3. The optical film layer according to claim 1, wherein the refractive index of the isotropic optical layer ranges from 1.0 to 2.5.

4. The optical film layer according to claim 1, wherein a difference between the ordinary light refractive index of the optically-uniaxial anisotropic optical layer and the refractive index of the isotropic optical layer ranges from 0.01 to 2.

5. The optical film layer according to claim 1, wherein the protruding structure is a triangular prism structure, a side surface of the triangular prism structure extends in a manner of contacting with the plate-shaped portion, extension directions of the plurality of protruding structures are parallel, and two adjacent protruding structures are disposed at intervals.

6. The optical film layer according to claim 1, wherein the protruding structure is a triangular pyramid structure, the plurality of protruding structures are arranged as a two-dimensional matrix array, and two adjacent protruding structures are disposed at intervals.

7. The optical film layer according to claim 1, wherein a material of the optically-uniaxial anisotropic optical layer comprises a dish-shaped liquid crystal molecule material.

8. The optical film layer according to claim 1, wherein the first grating layer is stacked on the side of the optically-uniaxial anisotropic optical layer away from the isotropic optical layer, the first grating layer comprises a transparent substrate and a plurality of strip-shaped metal layers formed on the transparent substrate, and the plurality of metal layers are disposed at intervals and in parallel; or
   the first grating layer is embedded in the side of the optically-uniaxial anisotropic optical layer away from the isotropic optical layer, the first grating layer comprises a plurality of strip-shaped metal layers formed in a side of the optically-uniaxial anisotropic optical layer, and the plurality of metal layers are disposed at intervals and in parallel.

9. The optical film layer according to claim 8, wherein a width of the metal layer ranges from 50 nm to 150 nm, a thickness of the metal layer ranges from 100 nm to 200 nm, and a spacing between two adjacent metal layers ranges from 100 nm to 200 nm.

10. An optical film layer, comprising:
    an isotropic optical layer, wherein a plurality of grooves are formed on a side of the isotropic optical layer;
    an optically-uniaxial anisotropic optical layer, including a plate-shaped portion and a plurality of protruding structures that match shapes and sizes of the grooves and that are in contact with a side of the plate-shaped portion, wherein an ordinary light refractive index of the optically-uniaxial anisotropic optical layer is greater than a refractive index of the isotropic optical layer; and
    a first grating layer, stacked on a side of the optically-uniaxial anisotropic optical layer away from the isotropic optical layer, or embedded in a side of the optically-uniaxial anisotropic optical layer away from the isotropic optical layer, wherein:
    the ordinary light refractive index of the optically-uniaxial anisotropic optical layer ranges from 1.0 to 2.5, and the refractive index of the isotropic optical layer ranges from 1.0 to 2.5; and
    a difference between the ordinary light refractive index of the optically-uniaxial anisotropic optical layer and the refractive index of the isotropic optical layer ranges from 0.01 to 2.

11. A display device, comprising:
    a backlight module, configured to provide incident light; and
    a display panel, disposed above the backlight module, and configured to receive the incident light and display a picture, wherein
    the display panel includes:
    the optical film layer according to claim 1;
    a first substrate, disposed on a side of the optical film layer away from the isotropic optical layer;
    a second substrate, disposed opposite to the first substrate;
    a display layer, disposed between the first substrate and the second substrate;
    a second grating layer, disposed between the display layer and the second substrate; and
    a photoresist layer, disposed between the second grating layer and the second substrate, or a photoresist layer, disposed between the first substrate and the display layer.

12. The display device according to claim 11, wherein the photoresist layer is disposed between the second grating layer and the second substrate, and the display panel further comprises:
    a compensation film layer, disposed between the display layer and the second grating layer; and
    a compensation film layer, disposed between the display layer and the first substrate.

13. The display device according to claim 11, wherein the photoresist layer is disposed between the second grating layer and the second substrate, and the display panel further comprises:
    a compensation film layer, disposed between the display layer and the second grating layer.

14. The display device according to claim 11, wherein the photoresist layer is disposed between the second grating layer and the second substrate, and the display panel further comprises:
- a compensation film layer, disposed between the display layer and the first substrate.

15. The display device according to claim 11, wherein the photoresist layer is disposed between the first substrate and the display layer, and the display panel further comprises:
- a compensation film layer, disposed between the display layer and the second grating layer; and
- a compensation film layer, disposed between the photoresist layer and the first substrate.

16. The display device according to claim 11, wherein the photoresist layer is disposed between the first substrate and the display layer, and the display panel further comprises:
- a compensation film layer, disposed between the display layer and the second grating layer.

17. The display device according to claim 11, wherein the photoresist layer is disposed between the first substrate and the display layer, and the display panel further comprises:
- a compensation film layer, disposed between the photoresist layer and the first substrate.

* * * * *